No. 831,346. PATENTED SEPT. 18, 1906.
A. L. HOOVER.
COLTER ATTACHMENT FOR POTATO DIGGERS.
APPLICATION FILED MAY 7, 1906.

2 SHEETS—SHEET 2.

Arthur L. Hoover,
INVENTOR.

WITNESSES:

By C. A. Snow & Co.
ATTORNEYS

UNITED STATES PATENT OFFICE.

ARTHUR L. HOOVER, OF AVERY, OHIO.

COLTER ATTACHMENT FOR POTATO-DIGGERS.

No. 831,346. Specification of Letters Patent. Patented Sept. 18, 1906.

Application filed May 7, 1906. Serial No. 315,603.

*To all whom it may concern:*

Be it known that I, ARTHUR L. HOOVER, a citizen of the United States, residing at Avery, in the county of Erie and State of Ohio, have invented a new and useful Colter Attachment for Potato-Diggers, of which the following is a specification.

This invention has relation to colter attachments for potato-diggers; and it consists in the novel construction and arrangement of its parts, as hereinafter shown and described.

The object of the invention is to provide an attachment for implements of the character specified, said attachment carrying colter-wheels which are adapted to cut the ground in advance of the potato-plow and at each side thereof, said wheels being so mounted and carried by a bell-crank lever that they may be thrown out of the ground, and at the same time the potato-plow will be elevated above the ground. When the above operation is reversed and the colter-wheels brought in contact with the ground, the potato-plow is also lowered into the soil.

Figure 1:
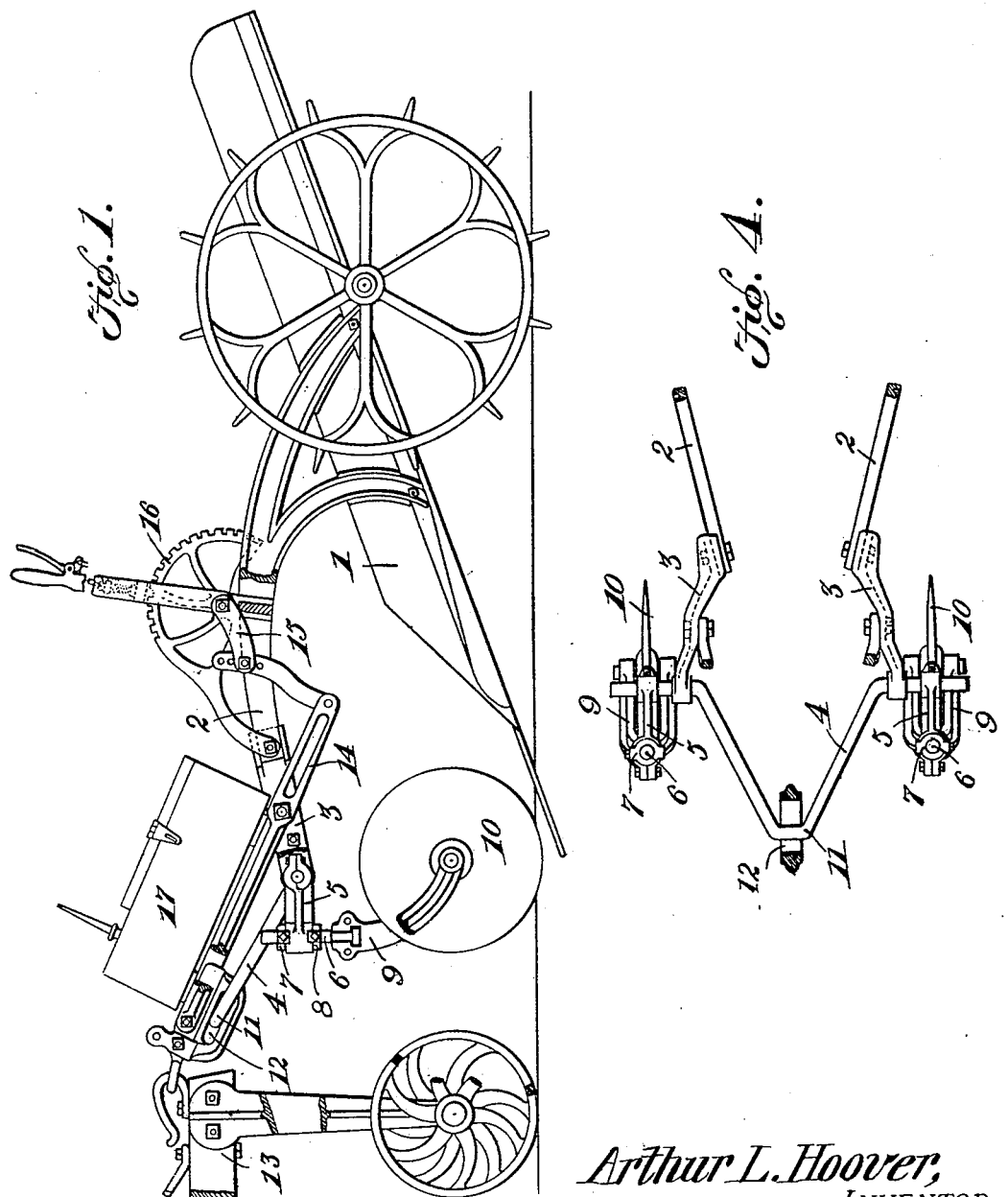
Figure 2:
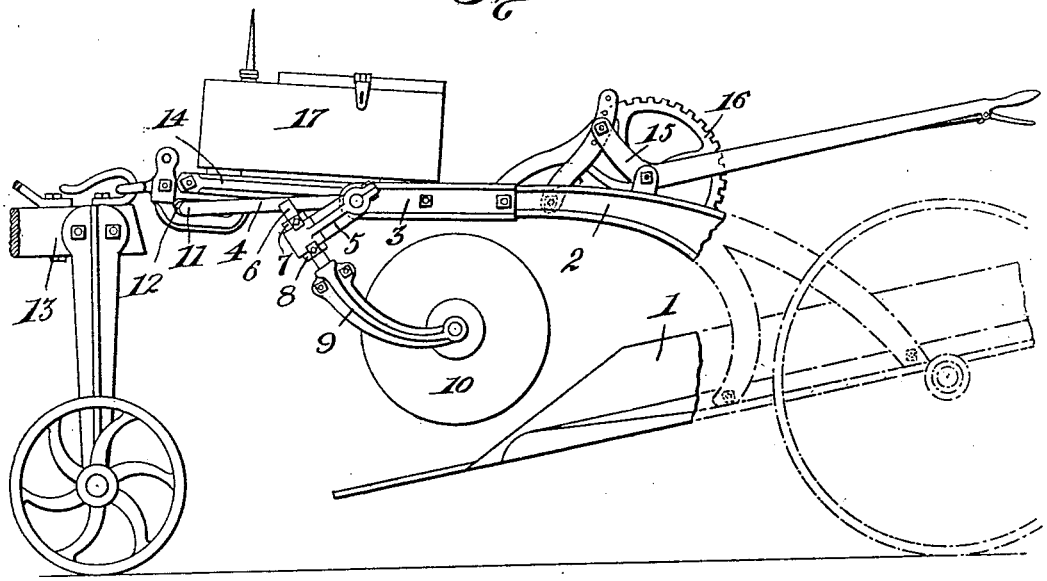
Figure 3:
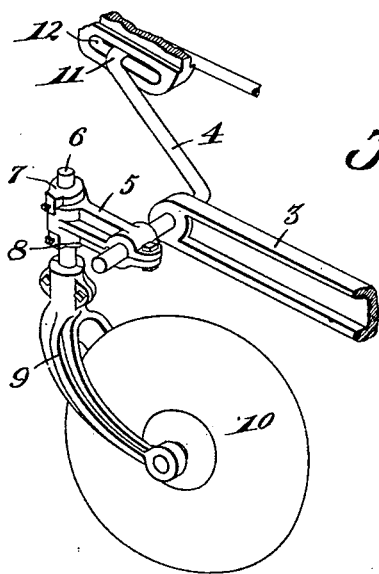

In the accompanying drawings, Figure 1 is a side elevation, partly in section, of a potato-digger, showing the colter-wheels and potato-plow operating in the ground. Fig. 2 is a side elevation of a potato-digger, showing the colter-wheels and the potato-plow elevated above the ground. Fig. 3 is a perspective view of the colter-wheels, showing the bell-crank lever to which they are attached. Fig. 4 is a top plan view of the bell-crank lever and its attachments.

The potato-digger 1 is provided with the forwardly-extending frame 2. The castings 3 3 are attached to the forward ends of the frame 2, and between the said castings the bell-crank lever 4 is journaled. The castings 5 5 are attached to the bell-crank lever 4 on the outer sides of the casting 3. The pins 6 are held by means of the collars 7 and 8 in the forward ends of the castings 5, the said collars 7 and 8 being held in position upon their respective pins 6 by means of set-screws. The arms 9 are swiveled to the lower ends of the pins 6, and between said arms the colter-wheels 10 are journaled. The bowed intermediate portion 11 of the bell-crank lever 4 extends to the front, and when the colter-wheels 10 are in contact with the ground the said intermediate portion 11 of the said bell-crank lever inclines upwardly toward its outer end. When the colter-wheels 10 are elevated above the ground, the said intermediate portion 11 of the bell-crank lever 4 extends downwardly at its outer end. The said portion 11 of the lever 4 passes through the elongated opening of an eye 12, and the said eye 12 is adapted to be coupled to the tongue-bearing truck 13.

The lever 14 is attached at its forward end to the eye 12 and at its rear end is pivoted to the working end of the lever 15 or an extension thereof, said lever 15 being suitably fulcrumed upon the frame of the potato-digger 1 and having a spring-actuated pawl adapted to engage the rack-segment 16. It will thus be seen that when the free end of the lever 15 is brought to the rear that the working end of said lever is elevated. The lever 14 is oscillated on its fulcrum and through the eye 12 causes the intermediate portion 11 of the bell-crank lever 4 to assume a downward incline. As the said eye 12 rests upon the tongue-bearing truck 13 and as the upper surface of said truck is always at the same relative height above the surface of the ground, the forward end of the framework of the potato-digger 1 is elevated and the potato-plow is raised above the surface of the ground. At the same time the colter-wheels are also raised above the surface of the ground. By reversing the operation above described the colter-wheels 10 and the potato-plow are caused to engage the ground substantially at the same time. The lever 14 may serve as a support for a tool-box 17, as indicated in the drawings.

What I claim as new is—

1. In combination with a plow-bearing implement and a tongue-bearing truck, an implement and truck-connecting means pivoted for vertical swing upon the implement, and a colter pivoted for horizontal swing on said means.

2. In combination with a plow-bearing implement and a tongue-bearing truck, an implement and truck-connecting means pivoted for vertical swing upon the the implement, a colter pivoted for horizontal swing on said means, and a lever mechanism for operating said truck-connecting means.

3. In combination with a plow-bearing implement and a tongue-bearing truck, a bell-crank lever fulcrumed upon the implement and connected to the truck, colters supported at the ends of said lever, and mechanism for operating said lever.

4. In combination with a plow-bearing implement and a tongue-bearing truck, a bell-crank lever fulcrumed to the implement and connected to said truck, arms swiveled at the ends of said lever, colter-wheels journaled to said arms, and a lever mechanism for operating the bell-crank lever.

5. In combination with a plow-bearing implement and a tongue-bearing truck, a bell-crank lever fulcrumed to the implement and connected to said truck, forwardly-extending castings secured to said bell-crank lever, pins supported by said castings, arms swiveled to said pins, colter-wheels journaled in said arms, and a lever mechanism operatively connected with said bell-crank lever.

6. In combination with a plow-bearing implement and a tongue-bearing truck, a bell-crank lever fulcrumed to the implement and connected to the truck, colter-wheels carried by said bell-crank lever, an eye receiving the crank portion of said bell-crank lever, and a lever-operated mechanism connected with said eye.

In testimony that I claim the foregoing as my own I have hereto affixed my signature in the presence of two witnesses.

ARTHUR L. HOOVER.

Witnesses:
I. W. HOOVER,
WM. WOLVERTON.